US009800420B2

(12) United States Patent
Bertorelle et al.

(10) Patent No.: US 9,800,420 B2
(45) Date of Patent: Oct. 24, 2017

(54) EMBMS OVER LAN (71) Applicants: Sequans Communications S.A., Paris (FR); Expway, Paris (FR)

(72) Inventors: Jérôme Bertorelle, Neuilly-sur-Seine (FR); Cédric Thiénot, Paris (FR)

(73) Assignees: SEQUANS COMMUNICATIONS S.A., Paris (FR); EXPWAY, Paris (FR)

( * ) Notice: Subject to any disclaimer, the term of this patent is extended or adjusted under 35 U.S.C. 154(b) by 0 days.

(21) Appl. No.: 14/093,113

(22) Filed: Nov. 29, 2013

(65) Prior Publication Data

US 2014/0241229 A1    Aug. 28, 2014

(30) Foreign Application Priority Data

Feb. 25, 2013 (EP) .................................. 13305213

(51) Int. Cl.
*H04H 20/71* (2008.01)
*H04L 12/18* (2006.01)
*H04W 4/06* (2009.01)
*H04W 76/00* (2009.01)
*H04W 12/06* (2009.01)
*H04W 84/12* (2009.01)
*H04W 88/18* (2009.01)
*H04W 92/02* (2009.01)
*H04W 12/02* (2009.01)

(52) U.S. Cl.
CPC .............. *H04L 12/18* (2013.01); *H04W 4/06* (2013.01); *H04W 12/06* (2013.01); *H04W 76/002* (2013.01); *H04W 12/02* (2013.01); *H04W 84/12* (2013.01); *H04W 88/182* (2013.01); *H04W 92/02* (2013.01)

(58) Field of Classification Search
CPC ................................ H04W 4/06; H04W 36/14
See application file for complete search history.

(56) References Cited

U.S. PATENT DOCUMENTS

| 2010/0189027 | A1* | 7/2010 | Ishida et al. ................... 370/312 |
| 2010/0246429 | A1* | 9/2010 | Hwang et al. ................. 370/252 |
| 2010/0325509 | A1* | 12/2010 | Kim ...................... H04L 1/1685 |
| | | | 714/750 |
| 2011/0149834 | A1* | 6/2011 | Jamadagni ..................... 370/312 |
| 2012/0155282 | A1* | 6/2012 | Dorenbosch ................ 370/241.1 |
| 2014/0177503 | A1* | 6/2014 | Sayeed .................... H04W 4/06 |
| | | | 370/312 |
| 2014/0194100 | A1* | 7/2014 | Anchan .......................... 455/416 |
| 2014/0219157 | A1* | 8/2014 | Sukumar ................. H04W 4/06 |
| | | | 370/312 |
| 2014/0229529 | A1* | 8/2014 | Barone ................. H04L 65/103 |
| | | | 709/203 |

FOREIGN PATENT DOCUMENTS

| CN | 100 544 359 C | 9/2009 |
| CN | 100 558 061 C | 11/2009 |

OTHER PUBLICATIONS

European Search Report, EP 13195207.9, dated Jul. 22, 2014.

* cited by examiner

*Primary Examiner* — Chi H Pham
*Assistant Examiner* — Fahmida Chowdhury
(74) *Attorney, Agent, or Firm* — Hamilton, Brook, Smith & Reynolds, P.C.

(57) ABSTRACT

There is provided an LTE device configured to connect to an LTE network, connect to or provide a LAN, and to provide eMBMS services over the LAN.

22 Claims, 8 Drawing Sheets

EMBMS OVER LAN

RELATED APPLICATION

This application claims priority under 35 U.S.C. §119 or 365 to European Application No. 13305213.4, filed Feb. 25, 2013. The entire teachings of the above application are incorporated herein by reference.

BACKGROUND

In the first version of LTE (release 8), only unicast (one to one) IP data was supported. Release 9 introduced optional support of eMBMS (evolved Multimedia Broadcast Multicast Service) that is capable of providing support of multicast and broadcast (one to many) to LTE networks. eMBMS is also capable of supporting multimedia streaming applications as well as file download.

As in all multicast system, the goal is to save bandwidth. For example, if 10 users request the same streamed video program, with unicast the data will be sent 10 times. However with eMBMS, the data will be sent only once. The same applies to the downloading of a file. For example, with a major OS update requiring hundreds of megabytes, eMBMS can render the sending of the upgrade over the LTE network more practical and bandwidth efficient.

eMBMS may also be used to multicast protected content, for example purchased data such as a commercial movie file. The content is encrypted over the air, and the end user is authenticated to ensure that only authorized users can access the content. The security architecture of eMBMS is based on the LTE modem Subscriber Identity Module (SIM) card. In effect it is the SIM card that is authenticated and used to provide the security system master key which allows access to and the decoding of the protected content.

In known systems, the decryption is carried out by eMBMS middleware running on the client in question, for example a mobile device, using credentials derived from the SIM card of the mobile device. In effect, this creates a one-to-one relationship between the eMBMS middleware and the SIM card. This is in-line with the approach of the 3GPP organization that sets the LTE and eMBMS standards, and which has until recently been focused on phone devices where the modem and applications are co-located in a single device. Further, the eMBMS middleware communicates with the LTE modem and is usually supported through a control API (application programming interface).

Therefore, a need exists for a more flexible approach to providing eMBMS services, with optional authentication of an end user device.

SUMMARY

According to a first aspect there is provided an LTE device as defined in claim 1. Thus there is provided an LTE device configured to connect to an LTE network, connect to or provide a LAN, provide eMBMS services over the LAN.

Optionally, the LTE device wherein the eMBMS services comprise encrypted eMBMS content.

Optionally, the LTE device comprising a modem portion and a modem interface.

Optionally, the LTE device further comprising an adaption function communicatively coupled to the modem interface; the adaption function being configured to communicate with an LTE client device over the LAN.

Optionally, the LTE device further comprising a middleware portion communicatively coupled to the modem portion via the modem interface; and an application interface communicatively coupled to the middleware portion.

Optionally, the LTE device further comprising an adaption function communicatively coupled to the application interface; the adaption function being configured to communicate with an LTE client device over the LAN.

Optionally, the LTE device further comprising a delivery portion communicatively coupled to the application interface.

Optionally, the LTE device wherein the adaption function is further configured to send a notification to a client device indicative of at least one of eMBMS service accessibility and eMBMS channel quality.

Optionally, the LTE device further configured to detect from a client device present on the LAN an indication that eMBMS services are desired and optionally to commence provision of eMBMS services to the client device.

Optionally, the LTE device further configured to halt provision of eMBMS services to the client device if the client device is not present or if the client device indicates that eMBMS services are no longer required.

Optionally, the LTE device further configured to halt provision of eMBMS services to the client device if the client device does not provide an indication at a predetermined time interval that eMBMS services are desired.

Optionally, the LTE device further comprising a retransmission function configured to receive retransmission requests from a client device and to retransmit eMBMS data to the client device in accordance with the request.

Optionally, the LTE device further configured to receive authorization information from a client device; verify the authorization information; and if verified, to authorize access by the client device to the provision of eMBMS services on the LAN.

Optionally, the LTE device further configured to receive corresponding authorization information from a server of the LTE network that provides the eMBMS services.

Optionally, the LTE device further configured to receive identification information from a client device of the LAN, and to forward the identification information to a server of the LTE network that provides the eMBMS services.

Optionally, the LTE device further configured to receive authorization information from the server of the LTE network and to forward the authorization information to the client device of the LAN.

Optionally, the LTE device further configured to receive a remote eMBMS access request with corresponding authorization information from the client device; to verify the authorization information, and if verified, to authorize access by the client device to the provision of eMBMS services on the LAN.

Optionally, the LTE device further configured to provide eMBMS decryption information to a client device to allow decryption of the encrypted eMBMS content by the client device.

Optionally, the LTE device further configured to decrypt the encrypted eMBMS content and to re-encrypt the content for communication to the client device over the LAN.

According to a second aspect there is provided a method of providing eMBMs services as defined in claim 18. The method comprising connecting to an LTE network, connecting to or providing a LAN, providing eMBMs services over the LAN.

Optionally, the method wherein the eMBMS services comprise encrypted eMBMS content.

Optionally, the method further comprising sending a notification to a client device indicative of at least one of eMBMs service accessibility and eMBMS channel quality.

Optionally, the method further comprising detecting from a client device present on the LAN an indication that eMBMS services are desired and optionally commencing provision of eMBMS services to the client device.

Optionally, the method further comprising halting the provision of eMBMS services to the client device if the client device is not present or if the client device indicates that eMBMS services are no longer required.

Optionally, the method further comprising halting the provision of eMBMS services to the client device if the client device does not provide an indication at a predetermined time interval that eMBMS services are desired.

Optionally, the method of further comprising receiving retransmission requests from a client device and retransmitting eMBMS data to the client device in accordance with the request.

Optionally, the method further comprising receiving authorization information from a client device; verifying the authorization information; and if verified, to authorizing access by the client device to the provision of eMBMS services on the LAN.

Optionally, the method further comprising receiving corresponding authorization information from a server of the LTE network that provides the eMBMS services.

Optionally, the method further comprising receiving identification information from a client device of the LAN, forwarding the identification information to a server of the LTE network that provides the eMBMS services.

Optionally, the method further comprising receiving authorization information from the server of the LTE network and forwarding the authorization information to the client device of the LAN.

Optionally, the method further comprising receiving a remote eMBMS access request with corresponding authorization information from the client device; verifying the authorization information, and if verified, authorizing access by the client device to the provision of eMBMS services on the LAN.

Optionally, the method further comprising providing eMBMS decryption information to a client device to allow decryption of the encrypted eMBMS content by the client device.

Optionally, the method further comprising decrypting the encrypted eMBMS content and re-encrypting the content for communication to the client device over the LAN.

Optionally, the method may be carried out by an LTE device.

According to a third aspect there is provided a non-transitory computer readable medium comprising machine readable instructions arranged, when executed by a processor, to cause the processor to carry out any or all of the methods described herein.

According to a fourth aspect there is provided a client device. Thus there is provided a client device configured to: connect to a LAN, determine if remote eMBMS services are available on the LAN.

Optionally, the client device is further configured to receive eMBMS content over the LAN from an LTE device.

Optionally, the client device wherein the eMBMS services comprise encrypted eMBMS content.

Optionally, the client device comprises an eMBMS application portion and an eMBMS application interface.

Optionally, the client device further comprises an adaption function communicatively coupled to the eMBMS application interface; the adaption function configured to communicate with an LTE device over the LAN.

Optionally, the client device further comprises a middleware portion communicatively coupled to the eMBMS application portion via the eMBMS application interface, and a modem interface communicatively coupled to the middleware portion.

Optionally, the client device further comprises an adaption function communicatively coupled to the modem interface; the adaption function configured to communicate with an LTE device over the LAN.

Optionally, the client device wherein the adaption function is further configured to receive a notification from an LTE device indicative of at least one of eMBMS service accessibility and eMBMS channel quality.

Optionally, the client device further configured to provide an indication that eMBMS services are desired.

Optionally, the client device wherein the indication is provided at a predetermined time interval.

Optionally, the client device further comprising a retransmission function configured to identify and request the retransmission of eMBMS data.

Optionally, the client device further configured to provide identification information to a server of the LTE network that provides the eMBMS services.

Optionally, the client device further configured to receive authorization information from the server of the LTE network that provides the eMBMS services and to provide the authorization information to an LTE device for gaining access to the LTE device and the provision of eMBMS services on the LAN.

Optionally, the client device further configured to provide identification information to an LTE device of the LAN, and to receive authorization information from the LTE device wherein the authorization information allows access to the LTE device and the provision of eMBMS services on the LAN.

Optionally, the client device further configured to receive eMBMS decryption information from the LTE device to allow decryption of the encrypted eMBMS content.

According to a fifth aspect there is provided a method of receiving eMBMS services. Thus there is provided a method of receiving eMBMS services comprising connecting to a LAN, determining if remote eMBMS services are available on the LAN.

Optionally, the method further comprising receiving eMBMS content over the LAN from an LTE device.

Optionally, the method wherein the eMBMS services comprise encrypted eMBMS content.

Optionally, the method further comprising receiving a notification from the LTE device indicative of at least one of eMBMS service accessibility and eMBMS channel quality.

Optionally, the method further comprising providing an indication that eMBMS services are desired.

Optionally, the method further comprising providing the indication at a predetermined time interval.

Optionally, the method further comprising identifying and requesting retransmission of eMBMS data.

Optionally, the method further comprising providing identification information to a server of the LTE network that provides the eMBMS services.

Optionally, the method further comprising receiving authorization information from the server of the LTE network that provides the eMBMS services and providing the authorization information to an LTE device for gaining access to the LTE device and the provision of eMBMS services on the LAN.

Optionally, the method further comprising providing identification information to an LTE device of the LAN, and receiving authorization information from the LTE device wherein the authorization information allows access to the LTE device and the provision of eMBMS services on the LAN.

Optionally, the method further comprising receiving eMBMS decryption information from the LTE device to allow decryption of the encrypted eMBMS content.

The LTE device may comprise an LTE server device.

Preferable and optional features are defined in the dependent claims

BRIEF DESCRIPTION OF THE DRAWINGS

Embodiments will now be described, by way of example only, and with reference to the drawings in which.

In the figures, like elements are indicated by like reference numerals throughout.

Overview

Currently, the number of LTE devices compared to non-LTE devices is small, therefore, it is desirable to allow access to eMBMS services to non-LTE devices over, for example, a LAN, typically WiFi. This would also allow access to operator provided eMBMS services on an LTE device which is not connected to an LTE network due to, for example, an LTE network being unavailable in the current location, or network credit having expired on the LTE device in question. In this manner a remote user model is provided where the user could install operator provided software on any smartphone, tablet or PC, and access the services remotely as long as they are connected to a LAN that is connected to the internet using an operator LTE device.

Figure 1A:
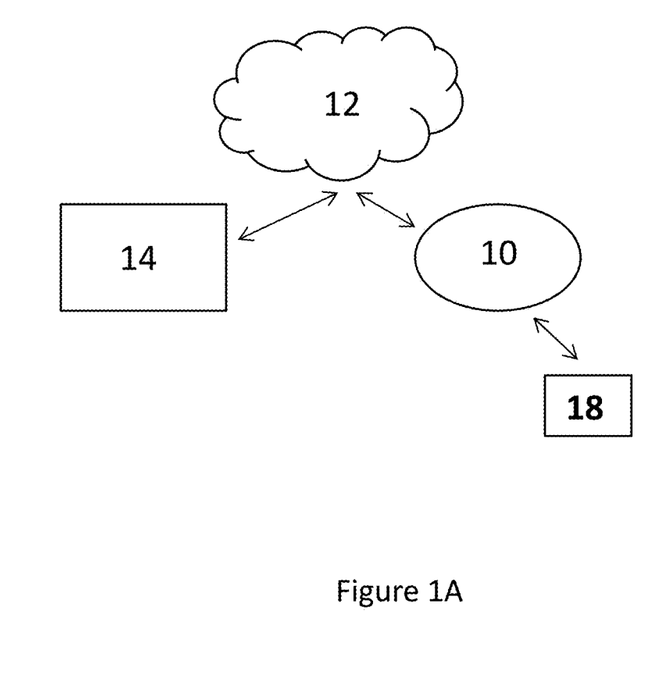
FIG. 1A, 1B illustrate a general arrangement of remote client device, LTE device and LAN network.
Figure 1B:
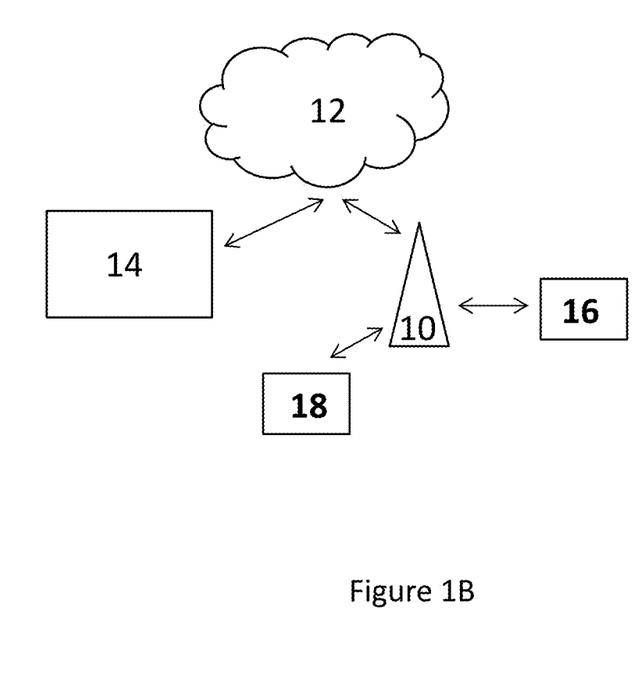

The above approach is exemplified with two scenarios as shown in FIGS. 1A and 1B:

The first example of FIG. 1A comprises an LTE device, here mobile router 10 (for example a MiFi router which may belong to the user) which may be considered to be an LTE server device. Here, the user would typically access eMBMS services over WiFi 12 provided by the LTE mobile router 10 from a client device 14 such as a WiFi enabled PC, tablet or smartphone after having installed a suitable application.

The second example of FIG. 1B is where a user (client device 14) connects their WiFi enabled device to an operator WiFi 12 hotspot provided by a server (which may be considered to be an LTE server 10) whose backhaul 16 is provided through an operator LTE network. In this second example it is seen that the LTE server device may not belong to the remote device user.

Accordingly, each system comprises a remote user device 14 (a client device) connected to a LAN 12, and an LTE server device 10 capable of providing eMBMS services over the LAN. The remote user may or may not be LTE capable. If dealing with secure eMBMS content, the system may comprise a further server device 18 associated with the network operator.

This remote access model is an addition to the standard MBMS specification. With the desire to provide eMBMS over LAN, there exist several issues with both the connecting remote device 14, and the eMBMS providing LTE provider 10:

1. A remote device may not always be connected to a LAN through an LTE device. Therefore, a means of eMBMS service discovery is desirable to let a remote device know when it is connected to a LAN where eMBMS is accessible.

2. When secure content is used, the remote device should be able to authenticate itself and be authorized by the LTE operator. This may not be able to be achieved through SIM card authorization as the remote device may not have an LTE SIM card, and/or the LTE device may not belong to the same owner as the remote (client) device.

3. The LTE device should be able to perform access control for remote (client) devices, based on their authentication status and operator provided authorization.

4. For protected eMBMS content, the security of that content (which is usually guaranteed up to the LTE device), should be extended over the LAN up to the remote (client) device.

5. Remote control of and access to requested content by the remote (client) device should be supported over the LAN. Based on requested data, the LTE device should have the option of decoding selected portions of data and only sending eMBMS content that has been requested. This is particularly relevant for a battery operated device (for example a mobile router).

Points 2 to 4 are only required when protected eMBMS content is accessed rather than publicly available content.

Throughout this specification, references to 'LTE network' should be interpreted as any LTE network or evolution thereof that supports eMBMs services.

DETAILED DESCRIPTION

Figure 2:
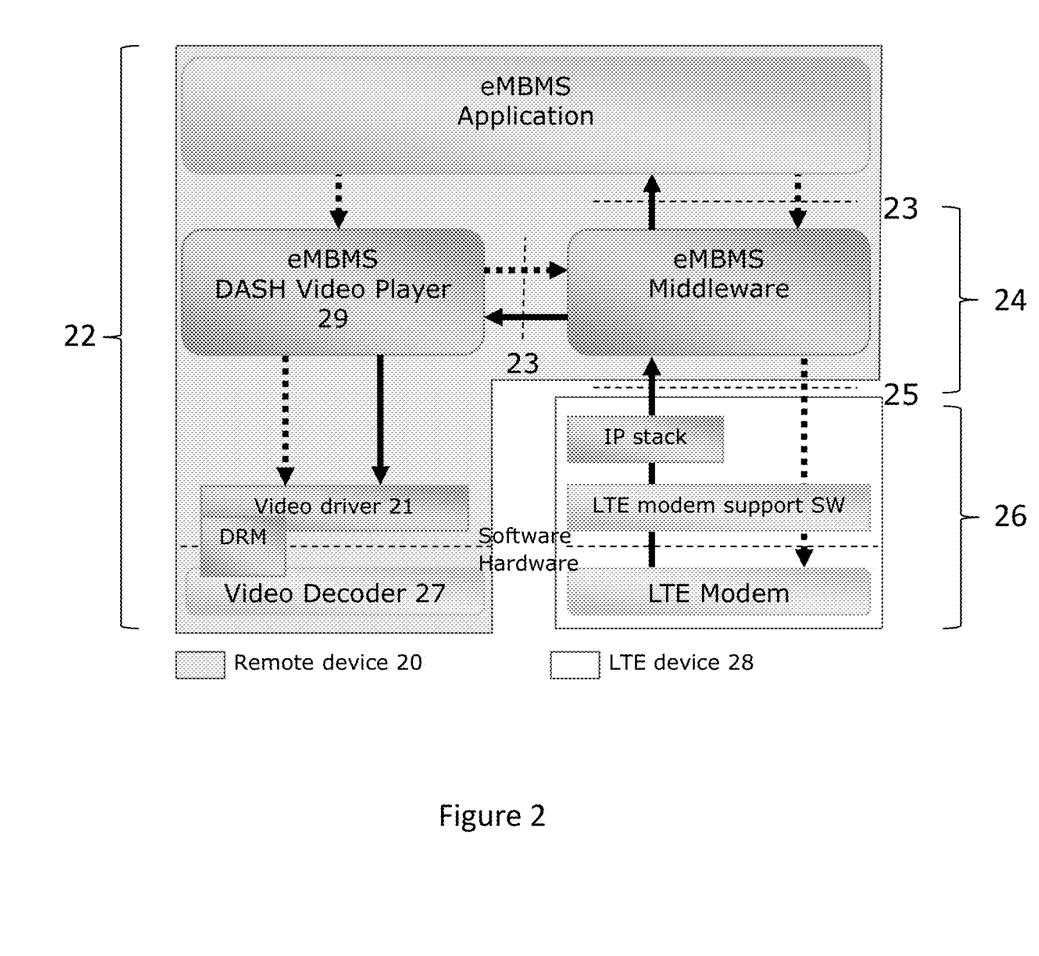
FIG. 2 illustrates an embodiment with a remote device comprising eMBMS middleware.

The support of eMBMS may be split between hardware and software functions across a remote device (which may be considered to be the client) and an LTE device (which may be considered to be the server) as illustrated in FIG. 2. In the embodiment of FIG. 2, remote device 20 (which may be a non-LTE device) comprises an application portion 22 and a middleware portion 24. LTE device 28 comprises a modem portion 26.

With the arrangement of FIG. 2, the remote device carries out the majority of the functions associated with eMBMS as can be seen. This arrangement allows for simpler scaling of eMBMS activity involving several remote devices as most of the processing is distributed over the remote devices.

Figure 3:
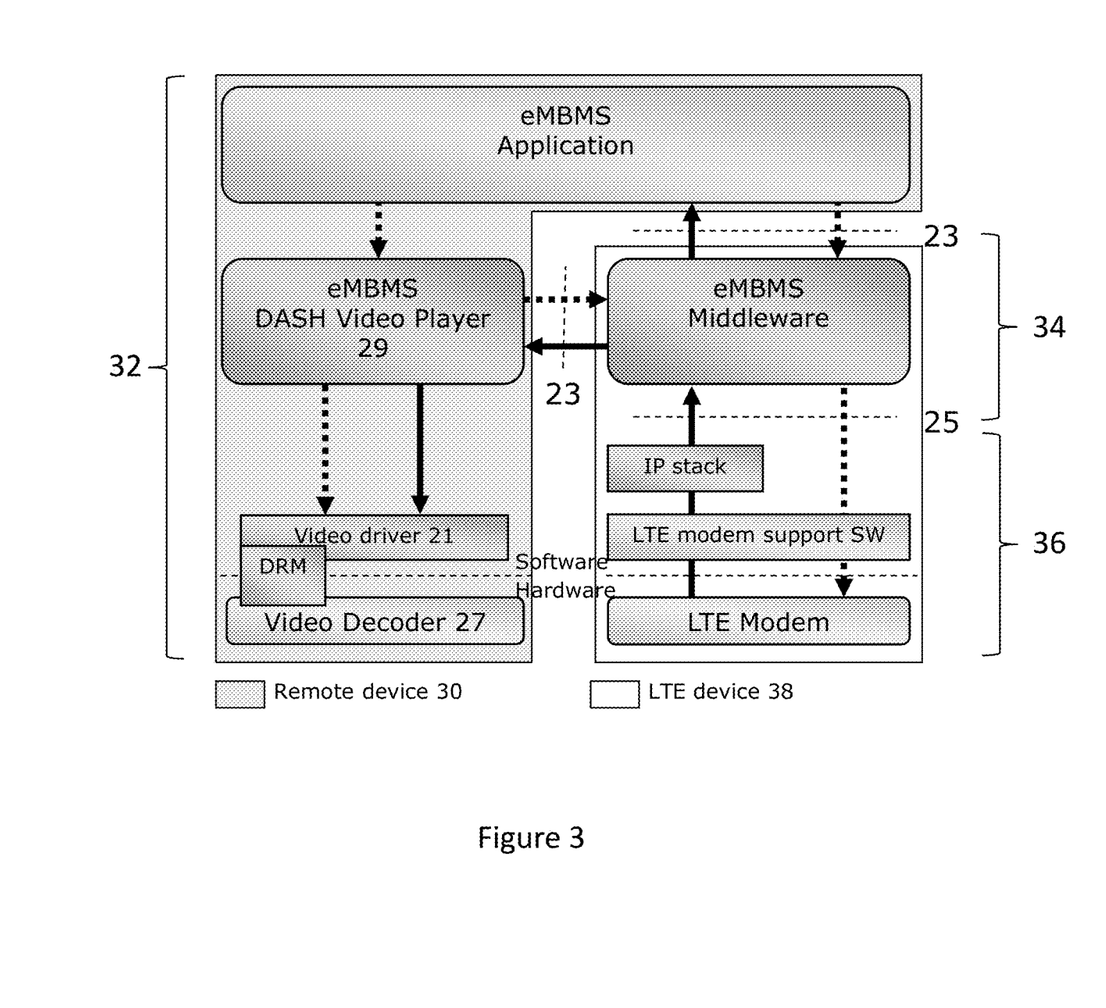
FIG. 3 illustrates an embodiment with an LTE device comprising eMBMS middleware.

An alternative arrangement is illustrated in FIG. 3. Here, remote device 30 (which may be a non-LTE device) comprises an application portion 32. LTE device 38 comprises a middleware portion 34 and a modem portion 36.

As would be understood, the remote device and the LTE device may each comprise one or more processors and associated memory. The processors may be provided with instructions to carry out any or all of the methods and schemes as described herein.

Throughout FIGS. 2 to 6, data flow is illustrated by the solid arrow, and control flow is illustrated by a dashed arrow.

In the arrangement of FIG. 3, the middleware is positioned on the LTE device. This provides the benefit that the FEC (forward error correction) data overhead does not need to be carried over the LAN. However, unlike the arrangement of FIG. 2, the FEC processing for all devices must be handled by the LTE device. This limits the ability to scale the system to a large number of remote devices due to the LTE bottleneck. A split between remote device 20 and LTE device 28 as in FIG. 2 is typically preferred.

In both FIGS. 2 and 3, the interface between the eMBMS middleware portion and the LTE modem portion is designated the modem interface 25. The interface between the middleware portion and application portion is designated the application interface 23.

Hence functionality is split between the client device and the LTE device at the modem interface 25 in FIG. 2 and at the application interface 23 in FIG. 3.

Figure 4:
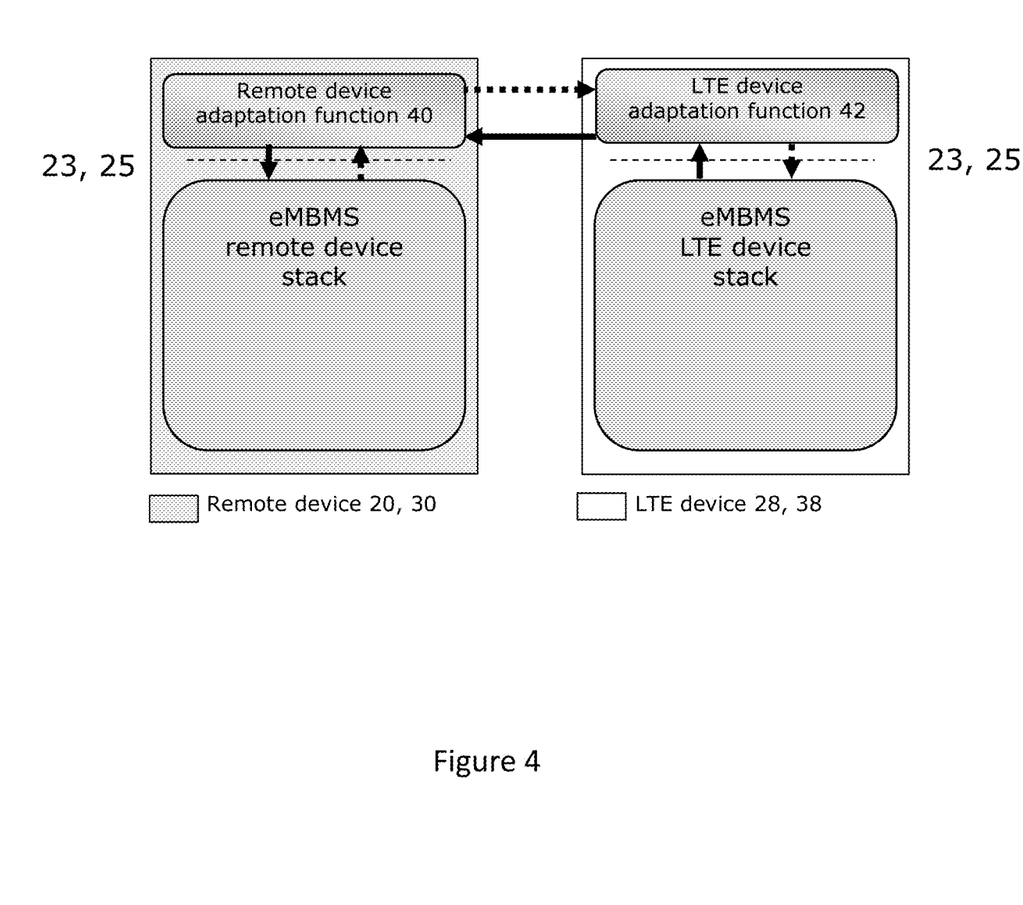
FIG. 4 illustrates an embodiment showing the arrangement of adaption functions at both a remote device and an LTE device.

With the arrangements of FIGS. 2 and 3, an adaption function (40, 42) for each of the remote device 20, 30 and LTE server 28, 38 may be positioned at the respective split, as shown in FIG. 4 (interface 25 of FIG. 2 and interface 23 of FIG. 3). This may be achieved by installing a custom client on the remote (client) device which allows the interfaces that are present from known systems to be rendered compatible with the eMBMS LAN extension as described herein. Each adaption function 40, 42 as shown in FIG. 4 provides communication between both the eMBMS functionality of the respective device and the other of the remote device and the LTE server as appropriate.

Figure 5:
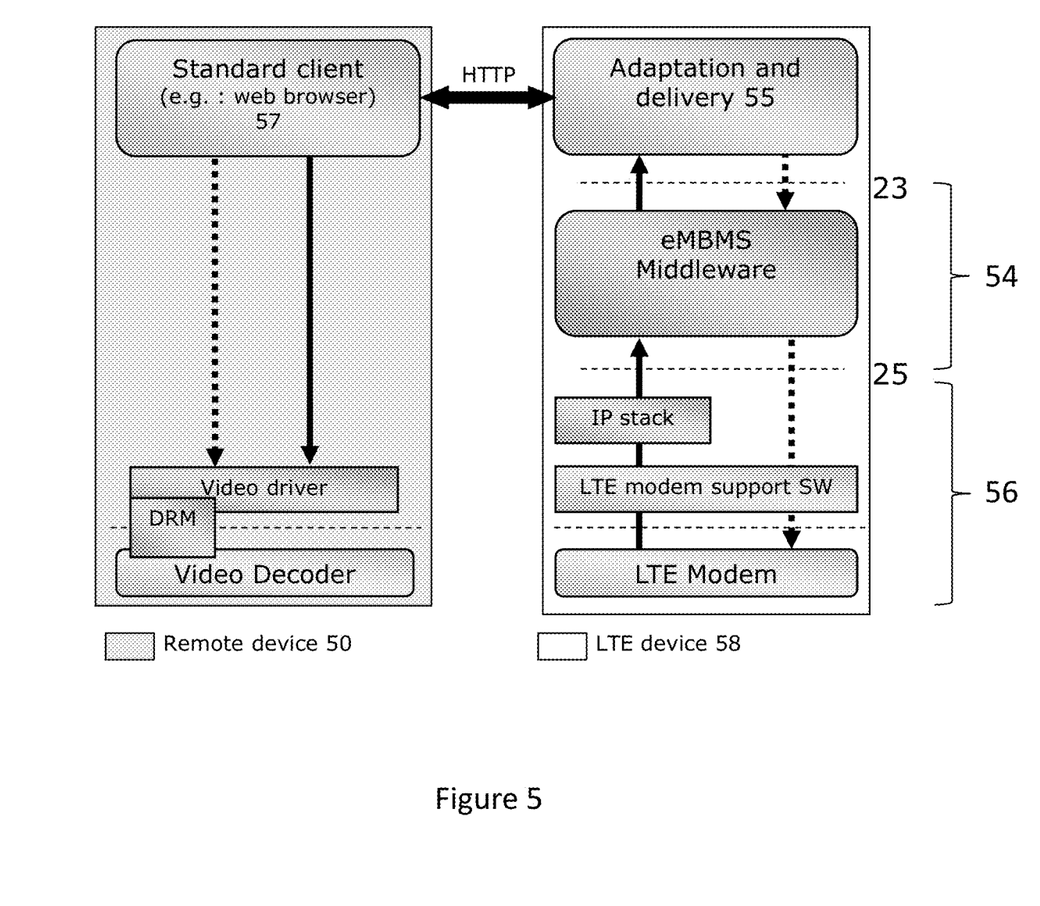
FIG. 5 illustrates an embodiment comprising an HTTP interface between a remote device and an LTE device.
Figure 6:
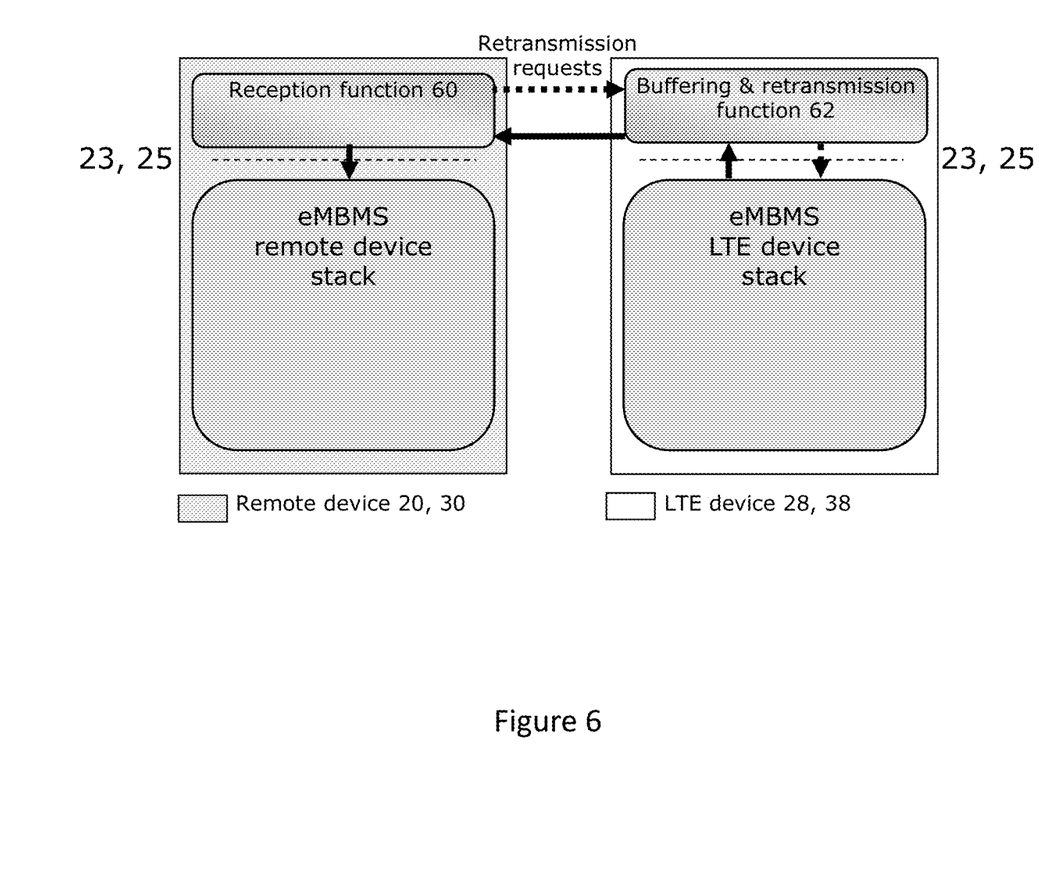
FIG. 6 illustrates an embodiment comprising a reception function in a remote device and a buffering and retransmission function on an LTE device.

FIG. 5 shows a third arrangement of hardware and software functions across a remote device 50 (which may be considered to be the client) and an LTE device 58 (which may be considered to be the server). Here, the full eMBMS functionality resides on the LTE device as denoted by middleware portion 54 and modem portion 56. This option allows the use of remote devices without the need to install local software on the remote device. In addition to the eMBMS functionality, the LTE device in this arrangement may also comprise an adaptation and delivery function 55 that renders the requested eMBMS content into a well-known format. This could be, for example, a web interface (HTTP) to enable remote device access to eMBMS video and downloaded files using a web browser 57 or other well-known and standard client on the remote device.

With the arrangement of FIG. 5, the scalability is limited compared to other options as every eMBMS manipulation is carried out on the LTE server device. Alternatively, a much more powerful LTE device could be used. A benefit of this arrangement is that remote eMBMS access over LAN is possible with no custom software installation on any remote devices.

Modem portions 26, 36, 56 may comprise any or all of:
an LTE modem comprising an LTE chipset and embedded software implementing LTE radio access network (RAN) support and in particular IP connectivity.
LTE modem support software: The eMBMS middleware may be generic and may therefore support several different LTE modem vendors. The LTE modem API is typically implementation specific and depends on the LTE modem. The modem support software bridges the gap and may provide both a modem specific API and a generic API 25 to the eMBMS middleware, independent of the modem implementation.
The Internet Protocol stack: An LTE modem provides IP connectivity and is seen as a data interface by a host processor IP stack, where the host is the processor making use of the LTE connectivity.

eMBMS middleware portion 24, 35, 54 may provide services to client eMBMS applications (such as the DASH video player) to join live linear video broadcast, schedule file download (FLUTE standard), receive service notifications and alerts and provide DASH compliant segmented video streams. The middleware implements FEC for eMBMS content, as per the 3GPP specification. The middleware interfaces with the LTE modem through the LTE modem support software to control the eMBMS reception on the LTE network in order to provide the requested services.

Application portion 22, 32 may comprise any or all of:
eMBMS DASH video player application
video driver to provide an API to access the video hardware to display content
Digital Rights Management (DRM) function. The DRM function decodes encrypted multimedia content (typically video and associated sound) and securely displays it on video hardware
video decoder: the hardware and software function for taking a compressed video stream (typically MPEG2 or MPEG4/H.264) and generating uncompressed video frames.

eMBMS Service Discovery

Tuning back to FIGS. 1A and 1B, client device 14 (remote device 20, 30, or 50 of FIGS. 2, 3, 5) may have no LTE support, and/or it may not always access the Internet through an LTE device, or a remote eMBMS capable LTE device. In order to request eMBMs services successfully, the remote device needs to be connected to a LAN or other wireless network where eMBMS services are being provided. Therefore it is beneficial for the remote device to be able to determine (discover) whether remote eMBMS access is supported by the current LAN to which it is connected.

Support of service discovery may be provided by the operator of the LTE network providing the eMBMS service by reserving a DNS name for discovery purposes, for example "remote-embms-present.operator.com". This name may not be defined in the public DNS, but the LTE devices 28, 38, 58 may support a DNS relay function (as supported for example by the dnsmasq software under Linux) to resolve the name to the IP address of the LTE device.

Accordingly, when the remote device 20, 30, 50 performs a DNS lookup for the relevant name, for example "remote-embms-present.operator.com":

It will fail if the remote device is not accessing the Internet through a remote eMBMS capable LTE device which is indicative of a lack of remote eMBMS support;
It will succeed if the Internet is reached through a remote eMBMS LTE capable device, with the IP address of the LTE device being provided to establish the connection.

Further, the remote device may not be able to detect changes in IP connectivity. Therefore, in the case where no service is detected, the remote device may attempt the DNS lookup at set intervals while the user still desires an eMBMS service.

Other options for service discovery include using UPnP, the underlying SSDP (Simple Service Discovery Protocol), or the IETF (Internet Engineering Task Force) Service Location Protocol.

All these mechanisms based on the Internet Protocol (IP) can operate over an arbitrary LAN. The remote client device, therefore, does not need to be directly connected to the LTE server device. A service discovery scheme such as a layer 2 mechanism using Ethernet multicast or broadcast frames may be used to discover whether eMBMS over LAN is available as would be understood by the skilled person.

Remote Client—LTE Server Interaction

Once it has been established that remote access to eMBMS services is available on a LAN via service discovery, the remote client device and the LTE server device may interact in the following manner depending on their arrangement.

For the arrangement of FIG. 5, the client-server (remote device-LTE device) interaction is based on existing protocols that are natively supported by the remote client device. For example, a web interface may be provided to provide the remotely accessible eMBMS content, and to stream that content over HTTP or FTP (for file download). An alternative approach for file download, which may be complementary, could be to provide a fileserver interface where the content is presented to the remote client as files in a file system. In this case the LTE server device could be arranged to download and cache data locally in anticipation of possible future remote device access.

Control Signalling

For the arrangements of FIGS. 2 and 3, as a custom client may be installed on the remote client device which may be configured as desired, a choice of protocols to be used over the LAN is available. The remote access by the remote client device may use any of several remote procedure call (RPC) schemes, for example XML-RPC, JSON-RPC, SOAP or CORBA or even a proprietary RPC method.

When the RPC mechanism does not natively include transport security, this may be added by tunneling the RPC traffic over an encrypted tunnel (SSL, TLS or IPSec for example) for authentication and protection of the control signalling exchanges. HTTPS is typically chosen for web RPC technologies.

Optionally, spontaneous notifications from the LTE device to the remote device may be supported. This provides the ability to indicate a change in eMBMS accessible services, or even loss of service, as well as providing information on eMBMS channel quality changes which may be used in a GUI bar graph display (typically used to indicate reception strength). Spontaneous notification may also be used to signal a required refresh of encryption keys in order to secure content over the LAN (protected content will be addressed later).

If the RPC mechanism used does not support events or spontaneous notifications from the client to the server (as lacking, for example, from XML-RPC, JSON-RPC or SOAP, or even some implementations of CORBA), then this can be addressed by the remote client being an RPC server to provide services to support such notifications. In this event, the LTE device (server) provides RPC services to use the remote eMBMS services, while the remote client device provides RPC services to support notification from the LTE server device.

Further, an LTE server device has knowledge of the LAN IP address used by the remote device as soon as the remote device connects to it to access the eMBMS service. If the remote device is to provide RPC services for notification support, then the information on how to access this interface (for example, which port number to connect to at the remote device IP address) may be provided by calling an LTE device RPC service at connection time, or be defined and known a priori by both the remote client device and the LTE (server) device.

Saving Battery Power

The decoding of an eMBMS session will consume some power, therefore, preferably, it should only be done when actually needed in the case of a battery powered LTE device, or for power efficiency reasons with other types of LTE server devices.

For the decoding of an eMBMS session to cease when not required means that the LTE device is able to stop the reception of a given eMBMS session (identified by its Temporary Mobile Group identifier—TMGI) when it is no longer needed. The TMGI (Temporary Mobile Group Identifier) can identify a given eMBMS session, for example, a streamed video program, or a file to download. The TMGI may be used to reference the session and its associated data across the whole eMBMS stack. At a high level (above IP), the TMGI may be associated to a multicast IP address carrying the session data and possibly transmission start and end dates for example. This information is given in the User Service Directory (USD), which describe available sessions/ programs. At a low level (radio), the TMGI is associated to low level radio resources containing the session data and may be used to provide the LTE chip with information as to the data that should be decoded in the present session.

The system is preferably robust enough to remote clients disappearing in an unmanaged way, for example due to bugs, crash or sudden loss of power, and also be able to disable the eMBMS session in question after the client has disappeared to avoid wasting resources.

To avoid the processing of an eMBMS session when it is not requested (for example if the client has 'gone away'), one of two approaches may be taken:

polling with a regular 'keep-alive' indication from the remote device(s) with a corresponding timer on the LTE device, or using remote device tracking on the LTE device.

With the polling approach, a timer of predetermined duration D on the LTE device is associated to each TMGI service that will be decoded. Variable D may be adjusted by the network operator as necessary. A remote client interested in receiving a given TMGI indicates regularly its continuing interest by calling an LTE device RPC service and providing the TMGI. Upon receiving the LTE device RPC request, the timer on the LTE device is reset. Should the timer count down to zero from D (or count up to D), no indication of continuing interest by a particular client device has occurred and it is assumed that there is no continuing interest in the TMGI content. As a result, reception by the LTE device of the content is halted. With this approach, there is no need for an LTE device to indicate the end of reception, as the implicit 'halt' from the lack of 'keep-alive' indication provides the same functionality.

With the polling approach, the decoding may continue for up to duration D even though there is no more interest in the TMGI content. Variable D may be chosen as a trade-off between providing decoding that uses wasted processing resources and the bandwidth consumed by the 'keep-alive' traffic, which is typically negligible on a LAN.

With the tracking approach, the LTE device is configured to keep track of all the sessions active for each client device. It will decode a session identified by its TMGI as long as at least one remote device continues to use that session, and will stop when no client device is associated with that session anymore. The tracking approach can be considered a form of reference counting, where the LTE device keeps track of how many clients use a given session and terminates decoding when the count reaches zero. In this scheme, the client indicates when decoding of a TMGI is no longer desired. This allows the LTE device to halt decoding of eMBMS content as soon as it is no longer desired, which is optimal. However, a sudden and unexpected disappearance of a remote client may occur due to, for example, a crash, or a loss of network connection. For robustness, the LTE device may be able to detect such a loss, and decrease the usage count of all the active sessions used by that particular remote client. This may be done by way of a lower level connection (transmission control protocol, TCP, or encrypted tunnel) timeout indication.

As in the polling method, this relies on 'keep-alive' signaling and timeout, however, rather than carrying them out at the remote eMBMS application level the LTE device may rely on lower layers such as TCP or encrypted tunnel.

For the arrangements of FIGS. 3 and 5, where the eMBMS middleware is located on the LTE (server) device, the switch off of the eMBMS reception should take into account the type of consumption of the service:

For a continuous consumption service, as long as a video player located in the remote device requests segments, the eMBMS reception should be active.

For a booked consumption service, if a record option is activated/authorized, any application located on the remote client device is able to request the LTE device to book the recording of part of live content.

For PushVOD (video on-demand) service, an application located on the remote device is able to request the LTE device to book the reception of push content. In such a case, the LTE device should keep the reception of the eMBMS service active during the period of the booking period although no remote device may be present.

Data Content Signalling

The use of multicast on the LAN side supports serving multiple remote clients efficiently, as the data needs to be transmitted only once per session, and not once per remote client as with unicast. However multicast is poorly supported over WiFi at the current time. The simple sending of multicast frames from an access point (AP) may freeze some WiFi device implementations. Because of the widespread use of WiFi this can be an important factor in the choice of local delivery scheme.

If the LAN is limited to WiFi only, a possible alternative to the use of multicast is DirCast, which keeps the bandwidth efficiency of multicast and is also able to handle LAN transmission error adaptation.

If unicast is used instead, in order to guarantee support in any environment including WiFi, the LTE device preferably includes an IP multicast to unicast adaptation function. This adaption function creates a unicast stream per client and per active eMBMS session or alternatively, a single unicast stream per client could contain all the eMBMS sessions for the client multiplexed together. The unicast session may be created by the remote device by connecting the LTE device socket defined by the adaption function on the LTE device. Alternatively, the LTE device can open the socket to a given protocol and port on the remote device, where the protocol is typically defined and the port is provided by the remote client to the LTE device using the control signaling described above. The adaption function copies the multicast data received on the LTE side to each active unicast connection on a remote device.

With some LAN technology, for example WiFi, certain remote devices may experience a poor link (due to poor WiFi coverage, for example) and as a result may suffer from a high packet error rate. For the arrangement of FIG. 2, it is possible to rely on the eMBMS error protection because the eMBMS FEC redundancy would also protect the LAN communication (as the middleware is situated on each remote client device), but this could increase the load on the eMBMS file repair servers. If this is not practical and also for an arrangement of FIG. 3, then a local retransmission function over the LAN may be required—see FIG. 6 where buffering and retransmission function 62 resides on the LTE device and corresponding reception function 60 (capable of sending retransmission requests to the LTE device) resides on the remote client device.

The ability to retransmit from the LTE device may require buffering at the LTE device, with the ability for the remote device to designate previously transmitted data as lost and request its retransmission. Further, the LTE device may in turn use the eMBMS file repair mechanism to fetch missing data if its local buffer is not sufficient, however this should not be common place.

To enable the remote (client) receiver device to identify the part of the data that is missing and request retransmission (by the LTE device), a sequence number of some form, either implicit based on a predefined data unit, or explicitly added to the transferred data may be used. This allows the receiver to:

1) Detect the part of the data (one or several packets worth of data) that have been lost.

2) Identify (to the transmitter LTE device) the part of the data that has been lost, so that the transmitter knows the data to retransmit.

A sequence number is associated with the data. This may be a counter for each byte in each packet of data (incremented by one for each byte) or a counter for each packet (incremented by one for each packet). With this, the receiver can detect a hole in the stream. For example, with a packet counter, if the receiver receives packet N, then later receives packet N+3, the receiver knows that two packets (N+1 and N+2) have been lost. A control message may be sent by the receiver to the transmitter to request retransmission of only the two lost packets (N+1 and N+2), by requesting their specific sequence numbers.

Such a scheme is an integral part of TCP in TCP/IP where a byte sequence number is used to count the bytes sent and received.

Such a scheme is not implemented in user datagram protocol (UDP), therefore, if UDP is used the application would need to implement its own equivalent scheme if packet errors are to be mitigated. This may be supported at the application level, using an ad-hoc data identification scheme and requesting retransmission through the control interface which is typically required with multicast or when using UDP in unicast. Alternatively, packet errors can be automatically handled by the transport scheme used over the LAN which occurs anyway in unicast mode when using TCP/IP as transport. When using unicast, the buffering and retransmission function will typically be integrated with the multicast to unicast adaption function on the LTE device, although this is not mandatory.

A further scheme to mitigate LAN errors may be provided by using 'broadcast'. With broadcast, the eMBMS traffic is sent over the LAN using a broadcast layer 2 (Ethernet) address. The 'broadcast' traffic will be received by all devices in the LAN, and the devices not interested will simply drop the traffic. With this scheme, security is operated in the same manner as multicast over LAN (a session key is provided to all receiving parties via secured unicast) to enable decoding of eMBMs data (see 'LAN specific encryption' described later).

For WiFi, the robustness of the broadcast traffic may be adjusted dynamically. With robust encoding, the eMBMS traffic will use more air time for a given amount of data (more robust, but less efficient), however, the (geographical) reach will be improved. Alternatively, a more efficient encoding may be used which reduces the network overhead, but also reduces the (geographical) reach due to higher error rate owing to a poor WiFi link.

Content Protection

The schemes discussed so far are equally applicable to protected or non-protected eMBMS data content, and allow for the successful provision of eMBMS services over LAN to a remote client that is not connecting to the eMBMS services directly through an LTE network. In the case of protected content, points 2 to 4 as described in the overview section should be considered.

Brief Discussion of Standard eMBMS Systems

A weakness of the standard eMBMS security model is that the decryption is carried out in the eMBMS middleware. For example, for video data, the player 29 is given unprotected content to pass to the platform video hardware 27. This arrangement would allow unprotected content to be intercepted on the device at the player 29 or driver level 21, or even at the video output. For video applications, a Digital rights management (DRM) scheme where the content stays protected end-to-end through the player and is decrypted in hardware and possibly up to the screen with (HDCP) may be preferred (this is the Android DRM model). The standard model is more applicable to scenarios where the LTE device is a trusted device. However, another protection scheme can be used on the LAN if needed to protect the data once it has been decrypted by the eMBMS middleware as follows:

For the arrangements of FIGS. 3 and 5, the standard eMBMS security model as-is is possible where a single middleware runs on the LTE device. However, for the LAN part of the transmission to the remote device, another security mechanism is required. Further, as the content will be decrypted on the LTE device in the eMBMS middleware to be re-encrypted over the LAN using a different scheme, if the LTE device is compromised in any way, the clear content could be retrieved by an attacker.

For the arrangement of FIG. 2, to reuse the eMBMS security model would require significant changes to the standard to support the potential for multiple concurrent middleware (of each remote client device) associated with a single LTE device.

When dealing with protected eMBMS content there can be a need to:

1. Identify the end-user and/or the remote device to the network;
2. Identify the network to the end user or remote device;
3. Authorize access to some content;
4. Authorize access to the LTE device.

1. The identification of the end-user is required for billing and access control. This can be done either directly, by providing user credentials, or indirectly by associating it to the LTE device SIM card or to a given hardware device. The identification of a device is required to control where the content is accessed, and avoid, for example, that access rights for a given subscription are used by too many unrelated devices, or to charge a fee per remote device used to access content. The notion of 'end-user' can cover a human user or a combination of a human user and a specific application or group of applications, when the remote device supports multiple remote eMBMS applications. These applications can have independent access control or can share access credentials among arbitrary groups of applications as needed for the target use-case and security requirements.

2. The verification of the network identity is to make sure that a fake network doesn't try to steal the end user credentials (login/password for example). This is optional but recommended.

3. Authorization to access some content is the purpose of DRM. It is typically based on providing shared secret materials that will be used to unlock the content usage on the remote device, although this depends on the DRM scheme used.

4. Authorization to access the LTE device is independent of the content protection, but can share the authentication scheme so is discussed here too. Decoding eMBMS content uses resources on the LTE device and will typically consume some power. Because of this, enabling eMBMS activity should only be possible for an authorized user. The goal is to prevent a user abusing the remote eMBMS system to drain another user mobile router battery for example. The access rights can be limited, for example to a specific duration or for only specific sessions. Another useful form of access control is limiting the access to the LTE device to certain other users' devices in exchange for reciprocity or other benefits. In this manner a user may allow eMBMS access to other users, or refuse access.

Authentication and Authorization

The authentication and authorization process involves three parties (see FIGS. 7, 8 and 9): the remote client device 70, the LTE (server) device 74 and a server in the operator network 72. There may be different servers to handle content access and LTE device access. The authentication process identifies an end-user, and associates a remote device to the end-user.

Figures 7, 8:
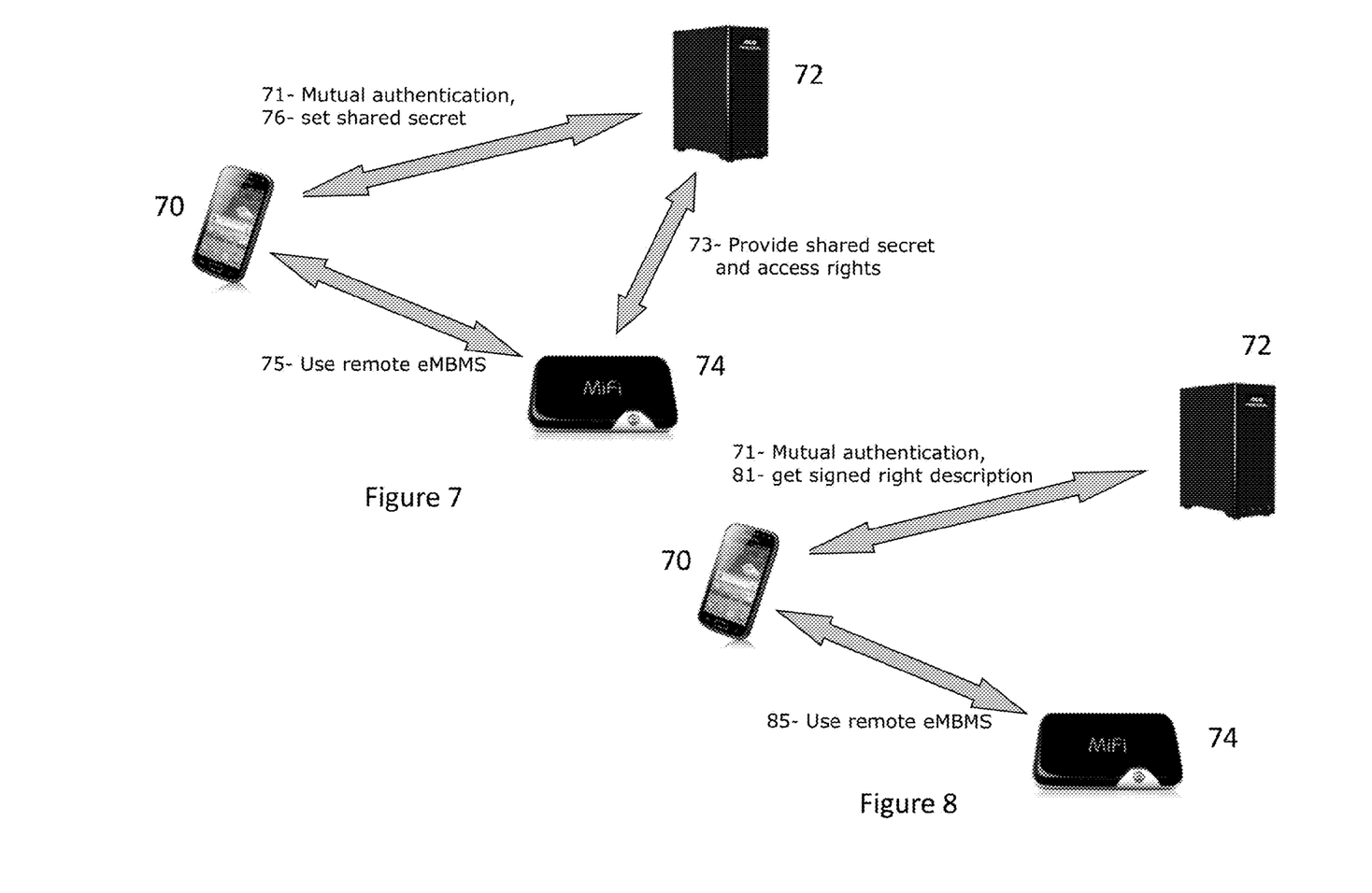
FIG. 7 illustrates authentication and authorization between a remote device and a server device.
FIG. 8 illustrates authentication and authorization between a remote device and a server device.

Two forms of authentication are described in the following:

In a first option, the remote device 70 communicates directly to the remote server 72 for mutual authentication (71). If the authentication step succeeds, the server will have provided credentials that will be used both in the process of accessing the content, and to access the LTE device.

For accessing the LTE device, there are two sub-cases as shown in FIGS. 7 and 8:

In FIG. 7, the server 72 can give a shared secret 76 to the remote device 70, and to the LTE device 74 with a description of the access rights (73). This shared secret is then used to authorize the remote device to access the LTE device services 75.

In FIG. 8, the server 72 can give a signed description of the access rights 81 to the remote device 70. The remote device 70 can directly provide this to the LTE device 74 to obtain access. The signing scheme can use a public encryption scheme, where the verification key is known to the LTE device 74.

The authentication between remote device 70 and server 72 may use a variety of known techniques, for example an SSL or TLS tunnel based on pre-configured certificates and mutual authentication. The protocol over the tunnel can be ad-hoc, or reuse HTTP request and response.

The exchange between the server 72 and LTE device 74 may use any known management protocol, for example open mobile alliance device management (OMA-DM) or simple network management protocol (SNMP), and can leverage the LTE network security.

The exchanges between the remote 70 and LTE device 74 are described later.

In a second option (FIG. 9), the authentication process for the remote device 70 to gain access 94 to the LTE device 74 is achieved via the LTE device. For eMBMS content access credentials, the LTE device relays the request 90, 91 to the server 72 and the response 92, 93 therefrom. The local access (the remote device accessing the LTE device over a LAN) may also be controlled by the network server, whereas the credentials to be used to secure the local access can be provided either directly by the LTE device 74 or the remote server 72.

Figure 9:
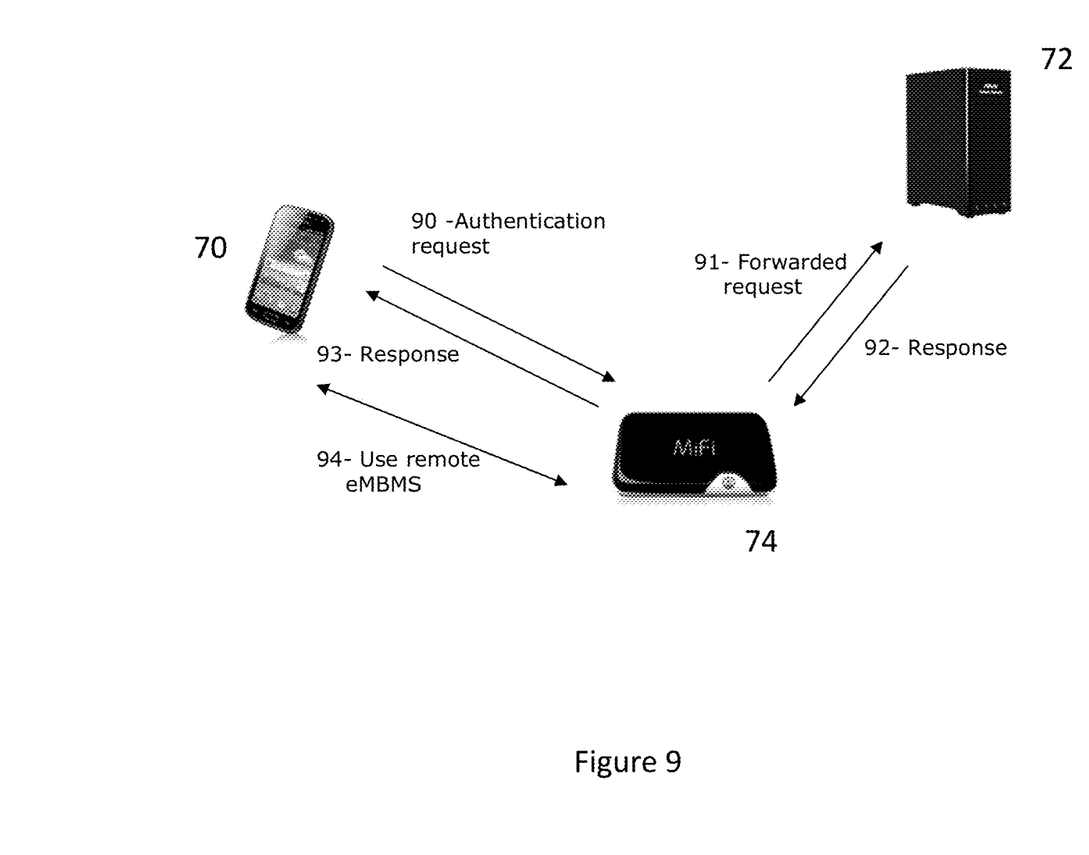
FIG. 9 illustrates authentication and authorization between a remote device and a server device via an LTE device.

The authentication exchange between devices as shown in FIG. 9 can use the same mechanism as in FIGS. 7 and 8 for authentication exchange between remote device 70 and server 72. The exchange between LTE device 74 and server 72 of FIG. 9 may use the same technique, or may use remote dial in user service authentication (RADIUS) or Diameter, for example as would be understood.

The authentication scheme may require a regular refresh to update the shared secret used to secure later communications as would be understood by the skilled person.

In all cases, the server 72 may contact the LTE device 74 at a later time to check the associated remote LTE devices, the sessions they use and possibly change their access rights. This can be done using a variety of administration protocols, such as OMA-DM or SNMP.

eMBMS Content Security Over LAN

Two strategies for providing eMBMS content over LAN are described. The first approach is suitable for the arrangement of FIG. 2, where the eMBMS raw content is sent over the LAN (as the decryption is carried out on the remote device by the eMBMS middleware). The first approach can also be applied to the arrangement of FIG. 3 for example for some video content when the decryption is taken charge of by a separate player application rather than the eMBMS middleware, for example the DASH player 29.

For the arrangements of FIGS. 3 and 5, standard eMBMS security may be used which must be added to by local LAN security between the LTE device middleware (which has decrypted the protect eMBMS content) and the remote device to provide secure protected content up to the remote device.

The second approach may be used with the arrangements of each of FIGS. 2, 3 and 5.

Two approaches to eMBMS security over LAN:

1. Reuse the standard eMBMS encryption support and extend it over the LAN, or
2. Adding a new LAN content encryption scheme between the LTE device middleware and the remote device.

Reusing eMBMS Encryption

When reusing eMBMS content encryption, the eMBMS encrypted content is sent over the LAN still in encrypted form. There is no decryption on the LTE device. The MBMS transport key (MTK) key is naturally associated with the content, as per the eMBMS specification, and will be forwarded to remote clients with the content. The MBMS session key (MSK) for the particular eMBMS content is provided to the remote clients in order to allow access to the MTK and to be able to decrypt the protected content. This may be achieved in two ways:

1. By allowing the LTE device to perform the regular eMBMS security process for the used sessions. The LTE device then establishes a MBMS user key (MUK) and acquires the MSK. The LTE device is then responsible for providing the MSK content to authorized remote clients;
2. By modifying the network eMBMS security support to allow remote clients to directly connect to a modified security function, and retrieve the MSK directly.

The first option is preferred as it requires no change on the network side, and only the addition of an MSK distribution function to the LTE device. The second option requires more changes, however it allows a direct and centralized control and view regarding key access, which has benefits for auditing. Further, the second option does not rely on the local security of the LTE device. The decision between both approaches is a trade-off between the costs of change to an established system versus a more secure centralized control.

Both approaches may build upon the remote user and device authentication and authorization scheme described herein by using a shared secret established in the user, and remote device authentication to establish a secure and authenticated connection to the MSK delivery function either in the network or in the LTE device. Using an LTE device (approach 1), avoids duplicating user authentication in the second centralized approach. This is because the previous authentication and authorization schemes describe how a shared secret key is established between the remote device, the LTE device and the network. This already established shared secret key may be used to provide a secure and authenticated connection to the MSK delivery function for providing the MSK to authenticated remote clients. Only an authenticated remote client will be able to decrypt the payload (content decryption information) and hence decrypt the eMBMS encrypted content.

LAN Specific Encryption

When using a LAN specific encryption scheme, the protected content is decrypted on the LTE device using the regular eMBMS security support, and re-encrypted for transmission over the LAN.

If the content is sent to the remote device using a unicast protocol, then the content may be encrypted using the shared secret established after a successful authentication. Alternatively, a specific content key may be securely defined using the shared secret, and the content may be encrypted with this content key. The second approach allows a more frequent update of the content key. The content may be directly encrypted, or as an alternative carried over an encrypted tunnel using SSL, TLS or IPSec for example as would be understood.

If the protected content is sent to several remote devices using a LAN multicast protocol, then a dedicated content key should be defined. This key is given to all the authorized remote devices safely, using their specific shared secret for protection in as many point to point exchanges between remote and LTE devices as there are remote devices. Then each remote device can use the content key to decrypt the received content. In this scheme, the content itself is encrypted using any of a variety of algorithm (AES, 3DES . . . ).

In order for the network server to remove access rights to any device at any time, the LTE device should be able to force a key exchange with any remote device at any time. In this way, if a remote device authorization is removed, the LTE device changes the content key and does not provide the new one to the rejected remote device, which terminates its access to the content.

Accordingly, there is provided a full coherent solution for the extension of eMBMS over a LAN.

By making eMBMS services accessible to more users simply by installing a local application, the network operator will increase the value of its content delivery system. If a network operator also has a WiFi network or provides home routers, then the provision of an LTE backhaul would allow eMBMS delivery through its WiFi hotspots or home routers.

With the embodiments described herein, an end user with an LTE capable mobile router can provide eMBMS services to all devices connected to the LTE capable mobile router.

Independent eMBMs Content Security

A further digital rights management (DRM) scheme over eMBMS may be used by adding a new custom description in the USD and managing this "over the top" (OTT). Such an OTT DRM scheme must be supported on the remote device and on the network side to handle authentication, authorization and possibly billing, but can be transparent to the rest of the eMBMS stack and is independent of eMBMS.

The OTT DRM approach is compatible with all arrangements described herein.

The approaches and methods described herein may be embodied on a computer readable medium, which may be a non-transitory computer readable medium. The computer readable medium carrying computer readable instructions arranged for execution upon a processor so as to make the processor carry out any or all of the methods described herein.

The term "computer readable medium" as used herein refers to any medium that stores data and/or instructions that cause a processor to operation in a specific manner. Such storage medium may comprise non-volatile media and/or volatile media. Non-volatile media may include, for example, optical or magnetic disks. Volatile media may include dynamic memory. Common forms of storage medium include, for example, a floppy disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

What is claimed is:

1. An LTE device comprising one or more processors and associated memory, the one or more processors provided with instructions configured to
   connect to an LTE network;
   connect to or provide a LAN;
   provide eMBMS services from the LTE network over the LAN;
   the LTE device further configured to utilize a Temporary Mobile Group Identifier that can identify an eMBMS session and reference the eMBMS session and its associated data, wherein the Temporary Mobile Group Identifier is associated with resources containing eMBMS session data;
   the LTE device further comprising a retransmission function configured to receive retransmission requests from a client device and to retransmit eMBMS data to the client device in accordance with the request.

2. The LTE device of claim 1 comprising a modem portion and a modem interface.

3. The LTE device of claim 2 further comprising an adaption function communicatively coupled to the modem interface; the adaption function being configured to communicate with an LTE client device over the LAN.

4. The LTE device of claim 2 further comprising a middleware portion communicatively coupled to the modem portion via the modem interface; and
   an application interface communicatively coupled to the middleware portion.

5. The LTE device of claim 4 further comprising an adaption function communicatively coupled to the application interface; the adaption function being configured to communicate with an LTE client device over the LAN.

6. The LTE device of claim 4 further comprising a delivery portion communicatively coupled to the application interface.

7. The LTE device of claim 3 wherein the adaption function is further configured to send a notification to a client device indicative of at least one of eMBMS service accessibility and eMBMS channel quality.

8. An LTE device comprising one or more processors and associated memory, the one or more processors provided with instructions configured to
   connect to an LTE network;
   connect to or provide a LAN;
   provide eMBMS services from the LTE network over the LAN;
   utilize a Temporary Mobile Group Identifier that can identify an eMBMS session and reference the eMBMS session and its associated data, wherein the Temporary Mobile Group Identifier is associated with resources containing eMBMS session data;
   detect from a client device present on the LAN an indication that eMBMS services are desired and commence provision of eMBMS services to the client device;
   the LTE device further configured to halt provision of eMBMS services to the client device if the client device is not present or if the client device indicates that eMBMS services are no longer required; or further configured to halt provision of eMBMS services to the client device if the client device does not provide an indication at a predetermined time interval that eMBMS services are desired.

9. The LTE device of claim 1 further configured to receive authorization information from a client device; verify the authorization information; and if verified, to authorize access by the client device to the provision of eMBMS services on the LAN.

10. The LTE device of claim 9 further configured to receive corresponding authorization information from a server of the LTE network that provides the eMBMS services.

11. An LTE device comprising one or more processors and associated memory, the one or more processors provided with instructions configured to
    connect to an LTE network;
    connect to or provide a LAN;
    provide eMBMS services from the LTE network over the LAN;
    utilize a Temporary Mobile Group Identifier that can identify an eMBMS session and reference the eMBMS session and its associated data, wherein the Temporary Mobile Group Identifier is associated with resources containing eMBMS session data;
    receive identification information from a client device of the LAN, and forward the identification information to a server of the LTE network that provides the eMBMS services;
    receive authorization information from the server of the LTE network and forward the authorization information to the client device of the LAN;
    the LTE device further configured to receive a remote eMBMS access request with corresponding authorization information from the client device; to verify the authorization information, and if verified, to authorize access by the client device to the provision of eMBMS services on the LAN.

12. The LTE device of claim 1 further configured to provide eMBMS decryption information to a client device to allow decryption of the encrypted eMBMS content by the client device.

13. The LTE device of claim 12 further configured to decrypt the encrypted eMBMS content and to re-encrypt the content for communication to the client device over the LAN.

14. A method of providing eMBMS services, the method comprising:
  connecting to an LTE network;
  connecting to or providing a LAN;
  providing eMBMS services from the LTE network over the LAN;
  utilizing a Temporary Mobile Group Identifier to identify an eMBMS session and reference the eMBMS session and its associated data, wherein the Temporary Mobile Group Identifier is associated with resources containing eMBMS session data;
  the method further comprising receiving retransmission requests from a client device and retransmitting eMBMS data to the client device in accordance with the request.

15. The method of claim 14 further comprising sending a notification to a client device indicative of at least one of eMBMS service accessibility and eMBMS channel quality.

16. A method of providing eMBMS services, the method comprising:
  connecting to an LTE network;
  connecting to or providing a LAN;
  providing eMBMS services from the LTE network over the LAN;
  utilizing a Temporary Mobile Group Identifier to identify an eMBMS session and reference the eMBMS session and its associated data, wherein the Temporary Mobile Group Identifier is associated with resources containing eMBMS session data;
  detecting from a client device present on the LAN an indication that eMBMS services are desired and commencing provision of eMBMS services to the client device;
  the method further comprising halting the provision of eMBMS services to the client device if the client device is not present or if the client device indicates that eMBMS services are no longer required; or further comprising halting the provision of eMBMS services to the client device if the client device does not provide an indication at a predetermined time interval that eMBMS services are desired.

17. The method of claim 14 further comprising receiving authorization information from a client device; verifying the authorization information; and if verified, to authorizing access by the client device to the provision of eMBMS services on the LAN.

18. The method of claim 17 further comprising receiving corresponding authorization information from a server of the LTE network that provides the eMBMS services.

19. A method of providing eMBMS services, the method comprising:
  connecting to an LTE network;
  connecting to or providing a LAN;
  providing eMBMS services from the LTE network over the LAN;
  utilizing a Temporary Mobile Group Identifier to identify an eMBMS session and reference the eMBMS session and its associated data, wherein the Temporary Mobile Group Identifier is associated with resources containing eMBMS session data;
  receiving identification information from a client device of the LAN, forwarding the identification information to a server of the LTE network that provides the eMBMS services;
  receiving authorization information from the server of the LTE network and forwarding the authorization information to the client device of the LAN;
  the method further comprising receiving a remote eMBMS access request with corresponding authorization information from the client device; verifying the authorization information, and if verified, authorizing access by the client device to the provision of eMBMS services on the LAN.

20. The method of claim 14 further comprising providing eMBMS decryption information to a client device to allow decryption of the encrypted eMBMS content by the client device.

21. The method of claim 20 further comprising decrypting the encrypted eMBMS content and re-encrypting the content for communication to the client device over the LAN.

22. A non-transitory computer readable medium comprising machine readable instructions arranged, when executed by a processor, to cause the processor to carry out the method of claim 14.

* * * * *